United States Patent [19]

Harbuziuk et al.

[11] Patent Number: 5,724,419
[45] Date of Patent: Mar. 3, 1998

[54] CALL OVERFLOW SYSTEM AND METHOD FOR AN AUTOMATIC CALL DISTRIBUTION SYSTEM

[75] Inventors: Wayne L. Harbuziuk, Wheaton; Dennis R. Doyle, Plainfield; James E. Anderson, Glen Ellyn, all of Ill.

[73] Assignee: Rockwell International Corporation, Costa Mesa, Calif.

[21] Appl. No.: 803,558

[22] Filed: Feb. 20, 1997

Related U.S. Application Data

[63] Continuation of Ser. No. 538,684, Oct. 3, 1995, abandoned.

[51] Int. Cl.$^6$ .............................. H04M 3/54; H04M 3/50
[52] U.S. Cl. ................. 379/265; 379/142; 379/127; 379/210
[58] Field of Search ........................ 379/265, 266, 379/142, 221, 220, 213, 201, 210, 211, 212, 127

[56] References Cited

U.S. PATENT DOCUMENTS 4,737,983  4/1988  Frauenthal et al. ............... 379/265
5,008,930  4/1991  Gawrys et al. .................... 379/212
5,384,841  1/1995  Adams et al. ..................... 379/266
5,469,504  11/1995  Blaha ............................... 379/265

Primary Examiner—Ahmad F. Matar
Attorney, Agent, or Firm—Welsh & Katz, Ltd.

[57] ABSTRACT

A call overflow system for transferring an overflow call received from a caller at an originating automatic call distributor to a destination automatic call distributor. The system includes an originating compilation portion at the originating automatic call distributor for compiling data relating to the overflow call to be transmitted to the destination automatic call distributor, the data including identification of whether the caller attempted to block a caller identification process, the overflow call being a type of telephone call wherein a call identifier is provided through the call identification process to the originating automatic call distributor and originating compilation portion even where the caller has requested a blocking of the caller identification process. The system further includes sending portion for sending the data from the originating automatic call distributor to the destination automatic call distributor and for transferring the overflow call to the destination automatic call distributor.

20 Claims, 3 Drawing Sheets

FIG. 2A

| Bits / Octet | 8 | 7 | 6 | 5 | 4 | 3 | 2 | 1 | |
|---|---|---|---|---|---|---|---|---|---|
| 1 | USER-TO-USER IDENTIFIER ELEMENT | | | | | | | | 36 |
| 2 | LENGTH OF INFORMATION ELEMENT | | | | | | | | 38 |
| 3 | ISDN OVERFLOW IDENTIFIER | | | | | | | | 40 |
| 4 | GATE/APPLICATION NUMBER | | | | | | | | 42 |
| 5 | DELAY IN QUEUE AT ORIGINATING SWITCH (LEAST SIGNIFICANT BYTE) | | | | | | | | 44 |
| 6 | DELAY IN QUEUE AT ORIGINATING SWITCH (MOST SIGNIFICANT BYTE) | | | | | | | | 45 |
| 7 | NUMBER OF DNIS DIGITS (46a) | | | | | | | | 46 |
| 7a | DNIS BCD DIGIT 1 | | | | DNIS BCD DIGIT 2 | | | | 46b |
| 7b | DNIS BCD DIGIT 3 | | | | DNIS BCD DIGIT 4 | | | | 46d |
| 8 | NUMBER OF ANI DIGITS (46c) | | | | | | | | 48 |
| 8a | ANI BCD DIGIT 1 | | | | ANI BCD DIGIT 2 | | | | 50 |
| 8b | ANI BCD DIGIT 3 | | | | ANI BCD DIGIT 4 | | | | 50 |
| 8c | ANI BCD DIGIT 5 | | | | ANI BCD DIGIT 6 | | | | 50 |
| 8d | ANI BCD DIGIT 7 | | | | ANI BCD DIGIT 8 | | | | 50 |
| 8e | ANI BCD DIGIT 9 | | | | ANI BCD DIGIT 10 | | | | 50 |
| 9 | ORIGINATING ACD SITE ID | | | | | | | | 52 |

| Bits<br>Octet | 8 | 7 | 6 | 5 | 4 | 3 | 2 | 1 |
|---|---|---|---|---|---|---|---|---|
| 10 | colspan="8" | CALL TRANSFER NUMBER 54 ||||||||
| 11 | colspan="8" | CURRENT CALL PRIORITY<br>(LOW = 0, NORMAL = 1, HIGH = 2, MAXIMUM = 3) 56 ||||||||
| 12 | colspan="8" | TRUNK PORT<br>(LEAST SIGNIFICANT BYTE) 58 ||||||||
| 13 | colspan="8" | TRUNK PORT 60<br>(MOST SIGNIFICANT BYTE) ||||||||
| 14 | colspan="5" | SPARE 62 ||||| colspan="2" | DNIS FLAG 64 || ANSWER FLAG 66 |
| 15 | colspan="3" | PRESENTATION INDICATOR 68 ||| colspan="5" | RESERVED FIELD 72 |||||
| 16 | colspan="8" | CALL SEQUENCE NUMBER<br>(LEAST SIGNIFICANT BYTE) 74 ||||||||
| 17 | colspan="8" | CALL SEQUENCE NUMBER 76 ||||||||
| 18 | colspan="8" | CALL SEQUENCE NUMBER 78 ||||||||
| 19 | colspan="8" | CALL SEQUENCE NUMBER 80<br>(MOST SIGNIFICANT BYTE) ||||||||
| 20<br>21<br>22 | colspan="8" | RESERVED FIELDS 82 ||||||||

CALL OVERFLOW SYSTEM AND METHOD FOR AN AUTOMATIC CALL DISTRIBUTION SYSTEM

This is a continuation of application Ser. No. 08/538,684, filed Oct. 3, 1995 (now abandoned).

BACKGROUND OF THE INVENTION

This invention relates generally to automatic call distributor networks comprised of a plurality of interconnected automatic call distributors and, more particularly, to a call overflow system and method for transferring calls from an originating automatic call distributor (ACD) to a destination ACD, for compiling data relating to the calls at the originating ACD and for transmitting the data to the destination ACD.

ACDs employing a multiport switch controlled by a central processing unit for selectively interconnecting a plurality of interior telephonic units with external telephonic units received at the multiport switch through an external telephonic network are well known. It is also known to send an external telephonic call received at an ACD to another ACD in an automatic call distribution network. Examples of such automatic call distribution networks are disclosed in U.S. Pat. No. 5,469,504 issued on Nov. 21, 1995 to Blaha entitled "Automatic Call Distributor With Intersubnetwork Customer Information Transfer System and Method" filed Oct. 14, 1992, the disclosure of which is hereby incorporated by reference.

In these known systems, a telephonic call made from an external telephonic unit of a regular public telephone network to which the ACD is connected, typically from a customer, is carried through the regular, public external telephonic network to one of the plurality of ACDs in the automatic call distribution network. Once the call is received, the originating ACD logically determines how the call is to be routed. The call is often directed to an agent associated with a gate at the originating ACD to service the call. However, it is desirable in an ACD network having two or more ACDs to route the telephonic call traffic as evenly as possible throughout the network. Therefore, in many situations, a call must be transferred or overflowed to an agent at another ACD in the automatic call distribution network. The agent receiving the original call may not be able to properly service the customer and, thus, the call must be transferred to another agent located at another destination ACD. Moreover, the telephonic traffic flow often exceeds the call capacity of a particular gate at the originating ACD thereby requiring a call to be overflowed to another trunk group or gate at another ACD in the network.

It is known to transfer a call from one ACD to another ACD through the regular public external telephonic network. Such a system is disclosed in commonly assigned U.S. Pat. No. 5,384,841 issued to Adams et al., entitled "Automatic Call Distribution Network With Call Overload System and Method" and issued on Jan. 24, 1995, the disclosure of which is hereby incorporated by reference. The Adams et al. invention increased the amount of information sent with the overflowed call. The additional information could then be advantageously used by the destination ACD, or the agent at the destination ACD. Although the Adams et al. invention is a significant improvement over prior systems, systems which provide even more information to the destination ACD are desired in the art.

For example, prior known systems do not transfer information identifying whether the caller attempted to block caller identification. As those skilled in the art will readily understand, caller identification (caller ID) involves transmitting the caller's telephone number to the receiving party. A special key sequence may be dialed however by the caller to block the transmission of this data. However, the special key sequence will not block the caller ID data when a particular telephone number, such as an 800 number, is dialed. Consequently, companies having 800 numbers may not want their agents to disclose information, such as the caller's telephone number and address, which indicates to the caller that the agent has the caller ID data. In prior systems agents unfortunately do not know if the caller attempted to block the caller ID data transmission.

Calls being transferred from the originating ACD to the destination ACD may have been transferred by agents who were unable to handle the calls. Alternatively, some calls may be transferred without the caller talking to an agent, such as when all agents at the originating ACD are busy. In prior systems, information indicating whether a call was originally answered by an agent is not sent to the destination ACD.

Additionally, identification of a dialed number identification service (DNIS) indicative of the originating ACD (originating DNIS) is not sent to the destination ACD. Further, identification of a trunk number indicative of the trunk at which a call was received at the originating ACD and identification of a call sequence number assigned to the call by the system are also not provided to the destination ACD in prior systems. Each of these pieces of information may be employed to identify a call from ACD to ACD throughout an ACD network. In particular, this information can be transmitted to a centralized host computer which maps the information to a database to retrieve information concerning the caller and transmit the information to any ACD that the call is routed.

Therefore, these known systems are limited by the restricted amount of information transferred to the destination ACD, thereby reducing the amount of routing and application features available in such an automatic call distribution network with overflow capability.

SUMMARY OF THE INVENTION

This need is met by a call overflow system for transferring an overflow call received from a caller at an originating automatic call distributor to a destination automatic call distributor. The system includes an originating compilation means at the originating automatic call distributor for compiling data relating to the overflow call to be transmitted to the destination automatic call distributor, the data including identification of whether the caller attempted to block a caller identification process, the overflow call being a type of telephone call wherein a call identifier is provided through the call identification process to the originating automatic call distributor and originating compilation means even where the caller has requested a blocking of the caller identification process. The system further includes sending means for sending the data from the originating automatic call distributor to the destination automatic call distributor and for transferring the .overflow call to the destination automatic call distributor.

In accordance with one aspect of the present invention, a call overflow system is provided comprising originating compilation means at the originating automatic call distributor for compiling data relating to an overflow call to be transmitted to the destination automatic call distributor, the data including at least one of the type of information of (a)

identification of whether the caller attempted to block a caller identification process; (b) identification of whether the call was answered at the originating automatic call distributor prior to transfer to the destination automatic call distributor; (c) identification of a dialed number identification service from the originating automatic call distributor; (d) identification of a trunk number representative of a trunk over which the call was received by the originating automatic call distributor; (e) identification of a call sequence number identifying the call; and (f) identification of a number of dialed number identification service values included with the overflow call. Sending means sends the data from the originating automatic call distributor to the destination automatic call distributor. The types of information contained in the data may comprise at least two, at least three, at least four, at least five or all types of information (a), (b), (c), (d), (e) and (f).

In accordance with another aspect of the present invention, a method for transferring an overflow call between an originating automatic call distributor and a destination automatic call distributor comprising the steps of: compiling data at the originating automatic call distributor relating to the overflow call, the data including at least one of the types of information of (a) identification of whether the caller attempted to block a caller identification process; (b) identification of whether the call was answered at the originating automatic call distributor prior to transfer to the destination automatic call distributor; (c) identification of a dialed number identification service from the originating automatic call distributor; (d) identification of a trunk number representative of a trunk over which the call was received by the originating automatic call distributor; (e) identification of a call sequence number identifying the call; and (f) identification of a number of dialed number identification service values included with the overflow call; and sending the data from the originating automatic call distributor to the destination automatic call distributor is provided. The types of information contained in the data may comprise at least two, at least three, at least four, at least five or all types of information (a), (b), (c), (d), (e) and (f).

These and other features and advantages of the present invention will become apparent from the following detailed description, the accompanying drawings and the appended claims.

BRIEF DESCRIPTION OF THE DRAWINGS

FIGS. 2A and 2B show the format of an information element data packet which may be advantageously employed in the automatic call distribution network shown in FIG. 1 in accordance with the present invention.

DETAILED DESCRIPTION OF THE INVENTION

Figure 1:
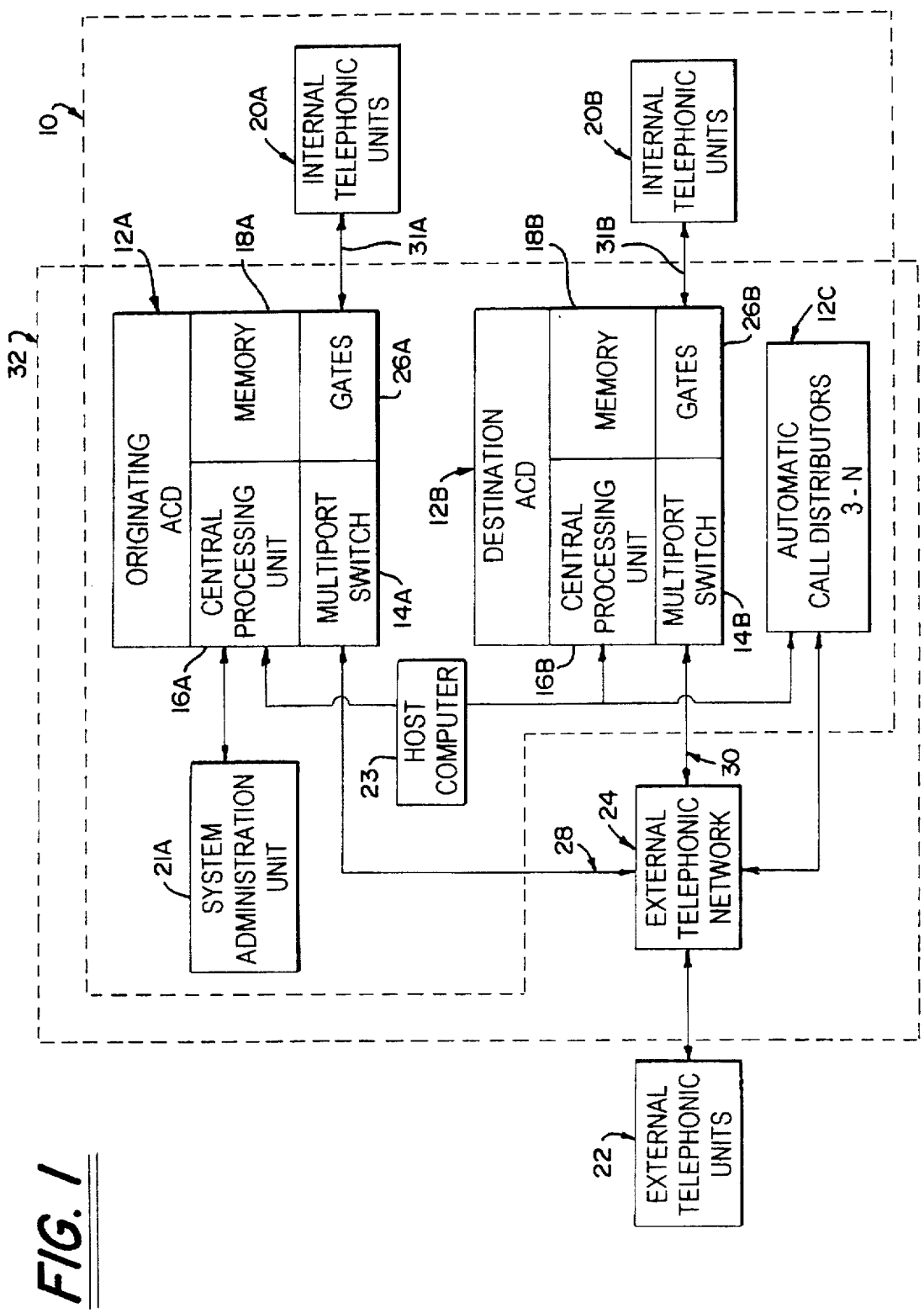
FIG. 1 is a functional block diagram of an automatic call distribution network for overflowing incoming telephone calls in accordance with the present invention.

A call overflow system is shown in FIG. 1 comprising an automatic call distribution (ACD) network 10 having a originating automatic call distributor (ACD) 12A, a destination ACD 12B and another ACD 12C. The originating ACD 12A has a multiport switch 14A controlled by a central processing unit (CPU) 16A in conjunction with a main memory 18A for distributing telephonic calls to internal telephonic units 20A. The CPU 16A working in conjunction with the main memory 18A comprises originating compilation means for compiling data relating to calls received at the originating ACD 12A The telephonic calls are received from external telephonic units 22 through a telephonic network 24. The originating ACD 12A receives a call from a caller at one of the external telephonic units 22 and routes the call to a gate 26A at which one or more agents stationed at the internal telephonic units 20A service the call. To distribute calls received from the external telephonic units 22 as evenly and efficiently as possible, the originating ACD 12A transfers or overflows received calls through the external telephonic network 24 upon meeting a specified overflow criteria to a selected destination ACD 12B in the ACD network 10. The multiport switch 14A, CPU 14A and memory 18A comprise sending means for sending the data from the originating ACD 12A to the destination ACD 12B.

The destination ACD 12B receives the overflow call sent from the originating ACD 12A via the network 24 at a multiport switch 14B which is controlled by a central processing unit 16B in conjunction with a main memory 18B and routes the call to a gate 26B representing one or more internal telephonic units 20B, if a predetermined overflow criteria (i.e. call is idle for predetermined period of time, all internal telephonic units for a particular gate are busy, etc.) is met. Agents stationed at the internal telephonic units 20B of the destination ACD 12B service the received call. If the transferred call is not accepted at the destination ACD 12B, then the originating ACD 12A alternatively transfers the call to another ACD 12C specified by a system administrator at a system administration unit 21 A for servicing of the call. Information regarding a call is provided to the one of the ACDs 12A, 12B or 12C which receives the call by a host computer 23.

Preferably, the telephonic call is prevented from being transferred back to the originating ACD 12A when being overflowed from the destination ACD 12B. Telephonic calls are transferred through the telephonic network 24 in utilizing a virtual private network service type. While the overflow system of the present invention can be implemented in a number of types of automatic call distribution networks having a plurality of automatic call distributors, it is preferably employed in an automatic call distribution network having automatic call distributors of the type shown in U.S. Pat. No. 5,268,903 issued on Dec. 7, 1993 to Jones et al. entitled "Multichannel Telephonic Switching Network With Different Signaling Formats and Connect/PBX Treatment Selectable For Each Channel", filed Oct. 2, 1991; U.S. Pat. No. 5,140,611 of Jones et al. entitled "Pulse Modulated Self-Clocking and Self-Synchronizing Data Transmission and Method for a Telephonic Communication Switching System", issued Aug. 18, 1992; U.S. Pat. No. 5,127,004 of Lenihan et al. entitled "Tone and Announcement Message Code Generator for a Telephonic Switching System and Method", issued Jun. 30, 1992; and U.S. Pat. No. 4,627,047 of Pitroda et al. entitled "Integrated Voice and Data Telecommunications Switching System", issued Dec. 2, 1986 and U.S. Pat. No. 5,469,504 issued on Nov. 21, 1995 Blaha entitled "Automatic Call Distributor With Intersubnetwork Customer Information Transfer System and Method", filed Oct. 14, 1992, the disclosures of which are hereby incorporated by reference.

The central processing unit 16A of the originating ACD 12A compiles data in an information element data packet 34, which is shown in FIG. 2, and sends this data to the destination ACD 12B. Preferably, the data is sent substantially simultaneously with the overflow call to the destination ACD 12B. The data contained in the information element data packet 34 enables the destination ACD 12B to efficiently route the overflow call and provides information to trigger the central processing unit 12B to perform various features at the destination ACD 12B, such as announcements of agents at internal telephonic units 20B, announcements to customers calling from external telephonic units 32, screen displays of data at the internal telephonic units, prioritization of call routing and network call handling reports.

The data carried in the information element data packet 34 is shown in greater detail in FIG. 2. Preferably, the information element data packet 34 contains at least one of the following types of information: (a) identification of whether the caller attempted to block a caller identification process; (b) identification of whether the call was answered at the originating automatic call distributor prior to transfer to the destination automatic call distributor; (c) identification of a dialed number identification service (DNIS) from the originating automatic call distributor; (d) identification of a trunk number representative of a trunk over which the call was received by the originating automatic call distributor; (e) identification of a call sequence number identifying the call; and (f) identification of a number of dialed number identification service values included with the overflow call.

Preferably, the transferring of an overflow call and the data in the information element data packet 34 on the present invention is used in an Integrated Services Digital Network (ISDN) environment. The format of the preferred information element data packet 34 is shown with the call information carded on the ISDN "D" channel in response to the sending or overflowing of a telephonic call from the originating ACD 12A to the destination ACD 12B. The information element data packet 34 is a variable length byte data packet having eight bits per byte. The information element data packet 34 may be included as part of a SETUP message when an overflow call is initiated between the originating multiport switch 14A and the destination multiport switch 14B. The information element data packet 34 contains information which the destination ACD 12B uses to route the call, to determine acceptance of the call, and to trigger the sending of data to internal telephonic units 12B servicing the overflow call.

Information identifying the information element data packet 34 is contained in byte one 36. The information in byte one 36 identifies to the central processing unit 16B of the destination ACD 12B that the received data packet is an ISDN user-to-user information element data packet 34. The ISDN user-to-user identifier element 36 further informs the external telephonic network 24 that the data contained in the information element data packet 34 concerns the ACD network 10 and the external telephonic network 24 should send the information element data packet 34 to the destination ACD 12B.

Byte two 38 contains the length of the information element data packet 34. The ISDN overflow identifier is in byte three 40. Byte four 42 provides the gate or application number. The gate application data in byte four 42 is the identification data of a selected gate 26B of the destination ACD 12B to which the overflow call is to be routed. In response to the receipt of the gate or application number in byte four 42 of the information element data packet 34 the central processing unit 16B of the destination ACD 12B connects the overflow call to a line 31B associated with the specified gate. The overflow call is thereby serviced at one of the internal telephonic units 20B associated with the specified gate.

Alternatively, if no gate number is specified in byte four 42 at the originating ACD 12A then the destination ACD 12B routes the received overflow call as it normally routes incoming ISDN calls from the external telephonic network 24. The routing of an overflow call not containing information relating to the identification of a selected gate 26B in byte four 42 of the information element data packet 34 is based on DNIS digits, ANI digits or a default gate at the destination ACD 12B. The system administration unit 21A selectively allows or prevents the sending of data identifying a selected gate 26B for the routing of a call received at the destination ACD 12B from the originating ACD 12A.

Bytes five and six 44 and 45 contain the delay time of the call at the originating ACD 12A. The central processing unit 16A of the originating ACD 12A maintains a record of the amount of time in which a received call is in queue waiting to be answered at the originating ACD 12A. The delay time of the calling party from the external telephonic unit 22 is carried in the information element data packet 34 to the destination ACD 12B. The delay time information received at the destination ACD 12B is used to evaluate the call handling performance throughout the ACD network 10. The central processing unit 16B at the destination ACD 12B determines a total delay time of the overflow call by adding the delay time data received in the information element data packet 34 with the delay time the call is in queue at the destination ACD 12B. Preferably, the central processing unit 16B at the destination ACD 12B routes calls having a longer delay time in queue to an internal telephonic unit 20B before another call having a shorter delay time.

Various types of telephonic calls, such as 1-900 and 1-800 or toll-free calls, received from the external telephonic units 22 frequently are assigned call type identification signals which are transferred with the call to the originating ACD 12A. These call type identification signals preferably are Dialed Number Identification Service (DNIS) digits or Automatic Number Identification (ANI) digits which are associated with different types of calls. Specifically, it is common practice for a long distance telephone carrier company of the public external telephonic network 24 to assign DNIS digits or ANI digits associated with different types of telephonic calls. Examples of such long distance carrier companies are American Telephone and Telegraph Co., MCI, Sprint and the like. The DNIS digits, ANI digits, or both, are carded concurrently with the telephonic call from the external telephonic network 24 to the originating ACD 12A. The DNIS digits, ANI digits, or both, are further carded with the telephonic call which is overflowed from the originating ACD 12A originally receiving the call to the destination ACD 12B receiving the overflow call.

A total number of DNIS digits included in the information element data packet 34 is contained in byte seven 46. The actual, transmitted DNIS digits are representative of the telephone number dialed by the caller. The actual DNIS digits are contained in bytes 7a and 7b which are divided into four DNIS BCD digits 46a, 46b, 46c and 46d. Although only four DNIS digits 46a, 46b, 46c and 46d are shown, any number of DNIS digits may be employed in the present invention. The number of DNIS digits may vary from call to call. The present invention has the flexibility to handle varying number of DNIS digit since the total number of DNIS digits for any one call is indicated in byte seven 46.

Byte eight 48 of the information element data packet 34 contains the data for the total number of ANI digits associated with the particular type of overflow call being sent to the destination ACD 12B. Bytes eight A through eight E 50 contain the ANI digits which represent the telephone number of the external telephonic unit 22 generating a call received at the originating ACD 12A and transferred as an overflow call to the destination ACD 12B. The ANI digits 50 are carried in the information element data packet 34 which is received at the destination switch 14B. The central processing unit 16B at the destination ACD 12B selectively uses the digital ANI information 50 for routing of the received overflow call to a designated gate 26B and in turn, to an internal telephonic unit 20B to service the call. The ANI information received at the destination ACD 12B also triggers the central processing unit 16B to send information and execute various applications at the internal telephonic units 20B. These applications include but are not limited to the playing of personal announcements regarding the type of incoming call to agents stationed at the internal telephonic units, displaying data regarding the call at agent terminals at the internal telephonic units and playing recorded messages to customers calling form the external telephonic unit.

Information regarding the identification of the site of the originating ACD 12A is located in byte nine 52 of the information element data packet 34. The data identifying the originating ACD 12A in byte nine 52 informs the central processing unit 16B of the destination ACD 12B as to the location of the ACD 12A in the ACD network 10 which transferred the overflow call. In response to receipt of the originating ACD site identification data 52, the central processing unit 16B of the destination ACD 12B determines the origin of the received overflow call. The originating ACD site information 52 is used by the central processing unit 16B of the destination ACD 12B to track data relating to the call received at the originating ACD 12A. The information 52 identifying the originating ACD 12A is particularly useful in an ACD network 10 in which data is accessed from a common data base stored in the host computer 23 by the originating ACD 12A and the destination ACD 12B, as described below.

Byte ten 54 of the information element data packet 34 includes information indicating a number of times a call has been transferred between ACDs. Each of the CPUs 16A, 16B and 16C comprise transfer count means which compile information relating to a number of times the call has been transferred. For example, each CPU 16A, 16B and 16C may increase the value contained in byte ten 54 when a call is transferred. In addition, the destination ACD 12B, and in particular CPU 16B, comprises overflow means which establishes a maximum overflow value, compares the maximum overflow value to the number of times the call has been transferred and prohibits further transfer of the call when the number of times the call has been transferred equals the maximum overflow value. This reduces the likelihood that a call would be repeatedly transferred, or overflowed, between two or more ACDs.

Byte eleven 56 contains information regarding the priority of the overflow call. Calls from the external telephonic units 22 of the external network 24 received at the originating ACD 12A are categorized into different priority levels. The system administrator at the system administration unit 21A inserts into the memory 18A of the originating ACD 12A the various priority levels for various calls received at the switch 14A. Preferably, calls assigned to higher priority levels are routed to internal telephonic units sooner than calls having a lower priority level. The priority level assigned to a particular call is inserted into byte eleven 56 of the information element data packet 34 in response to the call being overflowed to the destination ACD 12B. The assigned priority level 56 of the overflow call informs the destination ACD 12B of the categorized priority level of the call. The central processing unit 16B places the received call in the appropriate level within a queue to properly service the overflow call at the destination ACD 12B.

The implementation of ISDN standards ensures the sending of telephonic calls with associated call information between multiple ACDs 12A, 12B and 12C using PRI D-channels and B-channels through the telephonic network 24. This provides for a call overflow system 32 without the cost of dedicated D-channels and B-channels over tie lines between the call distributors. The use of ISDN messages to overflow a call allows specific information associated with the call to be sent from the originating ACD 12A to the destination ACD 12B.

A number of a trunk over which a call was received at the originating ACD 12A is contained in bytes twelve and thirteen 58 and 60. Byte fourteen 62 contains two types of information. Bit 64 of byte fourteen 62 provides information indicating whether the DNIS numbers discussed above were original DNIS numbers representative of the telephone number of a caller or DNIS numbers representative of the originating ACD 12A which transferred the call. Thus, DNIS numbers representative of either the telephone number of the caller or the originating ACD 12A may be advantageously employed in the present invention. Either of the DNIS numbers may be used to identify the call as the call is transferred throughout the ACD network 10.

Bit 66 of byte fourteen 62 contains information indicating whether a call was previously answered and then transferred or the call was transferred without being answered. If the call was previously answered, the agent who initially handled the call may have obtained information from the caller which is stored in the host computer 23, the CPU 16A or any other electronic memory. Bit 66 would then indicate that the call was answered and that there may be additional information stored in the host computer 23 which may be accessed by CPU 16B.

Byte fifteen 68 contains two fields 70 and 72. Field 72, which is located at byte fifteen, bits 1 through 5, is a reserved field. Field 70, which is located at byte fifteen, bits 6 and 7, contains information which indicates whether the caller has attempted to block a caller identification (caller D) process. As is well known, the caller D process transmits the caller's telephone number to the called party. Using the caller's telephone number, the originating ACD 12A may automatically retrieve data relating to the caller, such as the caller's name, address and the like, from the host computer 23 or other memory and present this data to an agent answering the call. Methods, such as dialing a specified sequence of numbers, are available for callers to block the caller ID process. However, this blocking technique does not operate to block transmission of the caller's telephone number if the caller is calling an 1-800, or toll free, number.

In prior systems, an agent unfortunately would not know whether the caller attempted to block the caller ID process. Consequently, the caller may be somewhat surprised, and even angry, when the agent recites the caller's name and address without being told this information. The present invention obviates this problem by displaying a message to the agent, in response to the information contained in field 70, that the caller has attempted to block the caller D process. The agent is then able to handle the call without devolving that the caller's name and address are already known.

Bytes sixteen through nineteen 74, 76, 78 and 80 contain a call sequence number which is assigned to a call by the originating ACD 12A. The call sequence number and the trunk number of a call may be used to identify the call throughout the ACD network 10. In particular, the call may be routed to any of the ACDs 12A, 12B or 12C. The ACD 12A, 12B or 12C receiving the call sends a call arrival data packet to the host computer 23 requesting any information that is stored or has been obtained regarding the call. The call sequence number or the trunk number of the call is contained in this call arrival data packet. The host computer 23 is then able to retrieve the information regarding this call based on either the call sequence number and/or the trunk number.

A telephonic call is received at the multiport switch 14A of the originating ACD 12A from the external telephonic unit 22 through the external network 24. The central processing unit 16A determines which gate 26A the call is to be routed. The memory 18A of the central processing unit 16A contains the predetermined criteria used for determining the overflow of a call to a destination ACD 12B. In response to the predetermined overflow criteria being met for a gate 26A at the originating ACD 12A, an ISDN route is used to select an idle ISDN B-channel utilizing a T-1 span line 28 to carry the call through the external telephonic network 24. The central processing unit 16A of the originating ACD 12A allocates an ISDN B-channel on the T-1 span line 28 for the transferring of the overflow call to the destination ACD 12B. The call received at the originating multiport switch 14A is selected for overflow to the destination multiport switch 14B of the destination ACD 12B.

Once an ISDN B-channel is selected for overflow and the received telephonic call at the originating ACD 12A awaiting answer by a gate server or internal telephonic unit 20A is selected for overflow service, the originating ACD 12A sends a message, such as a SETUP message, over a D-channel across T-1 span line 28 to the external telephonic network 24 and through trunk line T-1 span line 30 to a specified destination ACD 12B. A gate server or internal telephonic unit 20A is a device capable of answering a call directed to an associated gate 26A. The gate server devices are assigned to a gate 26A through primary, secondary or tertiary assignments. Preferably, gate servers 20A and 20B include but are not limited to: agent telephonic units in which agents service received calls, voice response units, automatic response units and gate private branch exchanges. The SETUP message is an ISDN layer three message used to indicate call establishment. The SETUP message contains the information element data packet 34 which provides the specific call routing and feature triggering information associated with the overflow call to the destination ACD 12B. A detailed description of the procedure for routing an overflow call at the destination ACD 12B may be found in the Adams et al. U.S. Pat. No. 5,384,841, the disclosure of which has been incorporated by reference. Since the structure and philosophy of routing the call at the destination ACD 12B are not important to the present invention beyond the utilization of the information provided to the destination ACD as described herein, this routing will not be further discussed.

While the advantages of the invention are preferably obtained in the ACD network 10 described above with reference to FIG. 1, the method can be practiced with any other ACD networks having means for transferring a call received at an originating ACD 12A to a destination ACD 12B through an external telephonic network. In any event, the preferred method of practicing the invention comprises the steps of: compiling data at the originating automatic call distributor relating to the overflow call, the data including at least one of the types of information of (a) identification of whether the caller attempted to block a caller identification process; (b) identification of whether the call was answered at the originating automatic call distributor prior to transfer to the destination automatic call distributor; (c) identification of a dialed number identification service from the originating automatic call distributor; (d) identification of a trunk number representative of a trunk over which the call was received by the originating automatic call distributor; (e) identification of a call sequence number identifying the call; and (f) identification of a number of dialed number identification service values included with the overflow call; and sending the data from the originating automatic call distributor to the destination automatic call distributor.

Preferably, the step of sending the data comprises the step of sending the data over an external telephonic network to the destination automatic call distributor. The method may further comprise the step of transferring the overflow call to another automatic call distributor in response to the destination automatic call distributor not accepting the overflow call from the originating automatic call distributor. The method may further comprise the step of limiting a number of times the overflow call may be transferred.

Having thus described the invention in detail by way of reference to preferred embodiments thereof, it will be apparent that other modifications and variations are possible without departing from the scope of the invention defined in the appended claims. Therefore, the spirit and scope of the appended claims should not be limited to the description of the preferred versions contained herein.

What is claimed is:

1. A call overflow system for transferring an overflow call received from a caller at an originating automatic call distributor to a destination automatic call distributor, the system comprising:

originating compilation means at the originating automatic call distributor for compiling data relating to the overflow call to be transmitted to the destination automatic call distributor, the data including identification of whether the caller attempted to block a caller identification process, the overflow call being a type of telephone call wherein a call identifier is provided through the call identification process to the originating automatic call distributor and originating compilation means even where the caller has requested a blocking of the caller identification process; and sending means for sending the data from the originating automatic call distributor to the destination automatic call distributor and for transferring the overflow call to the destination automatic call distributor.

2. The call overflow system as recited in claim 1 wherein the originating compilation means compiles data including identification of whether the call was answered at the originating automatic call distributor prior to transferring to the destination automatic call distributor.

3. The call overflow system as recited in claim 2 wherein the originating compilation means compiles data including identification of a trunk number representative of a trunk over which the call was received by the originating automatic call distributor.

4. The call overflow system as recited in claim 1 wherein the originating compilation means compiles data including number of digits in the dialed number identification service output and dialed number identification service output from the originating automatic call distributor.

5. The call overflow system as recited in claim 1 wherein the originating compilation means comprises transfer count means which increases a value relating to a number of times the call has been transferred.

6. The call overflow system as recited in claim 5 herein the data sent to the destination automatic call distributor includes the number of times the call has been transferred, and wherein, the destination automatic call distributor comprises overflow means for establishing a maximum overflow value, for comparing the maximum overflow value to the number of times the call has been transferred and for prohibiting further transfer of the call when the number of times the call has been transferred equals the maximum overflow value.

7. The call overflow system as recited in claim 3 wherein the destination automatic call distributor responds to identification of the trunk number in the data received from the originating automatic call distributor to track data relating to the call received at the originating automatic call distributor.

8. The call overflow system as recited in claim 1 wherein the originating compilation means compiles data including identification of a call sequence number identifying the call; and wherein the destination automatic call distributor responds to identification of the call sequence number in the data received from the originating automatic call distributor to track data relating to the call received at the originating automatic call distributor.

9. The call overflow system as recited in claim 1 wherein the originating automatic call distributor comprises means for transferring the overflow call to another automatic call distributor in response to the destination automatic call distributor not accepting the overflow call from the originating automatic call distributor.

10. The call overflow system as recited in claim 1 wherein the originating automatic call distributor comprises means for transmitting at least one of the data and the overflow call over an external telephonic network to the destination automatic call distributor.

11. The call overflow system as recited in claim 10 wherein the external telephonic network is a public external telephonic network.

12. The call overflow system as recited in claim 10 wherein the external telephonic network is an integrated services digital network.

13. A method for transferring an overflow call between an originating automatic call distributor and a destination automatic call distributor comprising the steps of:

compiling data at the originating automatic call distributor relating to the overflow call, the data including identification of whether the caller attempted to block a caller identification process, the overflow call being a type of telephone call wherein a call identifier is provided through the call identification process to the originating automatic call distributor and originating compilation means even where the caller has requested a blocking of the caller identification process; and sending the data from the originating automatic call distributor to the destination automatic call distributor; and transferring the overflow call to the destination call distributor.

14. The method as recited in claim 13 wherein the step of compiling data comprises the step of compiling the data including identification of a call sequence number identifying the call.

15. The method as recited in claim 13 wherein the step of compiling data comprises the step of compiling the data including identification of a dialed number identification service relating to the overflow call.

16. The method as recited in claim 13 wherein the step of compiling data comprises the step of compiling the data including identification of whether the call was answered at the originating automatic call distributor prior to transferring to the destination automatic call distributor.

17. The method as recited in claim 13 wherein the step of compiling data comprises the step of compiling the data including identification of a trunk number representative of a trunk over which the call was received by the originating automatic call distributor.

18. The method as recited in claim 13 wherein the step of sending the data comprises the step of sending the data over an external telephonic network to the destination automatic call distributor.

19. The method as recited in claim 13 comprising the step of transferring the overflow call to another automatic call distributor in response to the destination automatic call distributor not accepting the overflow call from the originating automatic call distributor.

20. The method as recited in claim 19 comprising the step of limiting a number of times the overflow call may be transferred.

* * * * *